United States Patent [19]

Boll et al.

[11] Patent Number: 5,644,720
[45] Date of Patent: Jul. 1, 1997

[54] INTERPROCESS COMMUNICATIONS INTERFACE FOR MANAGING TRANSACTION REQUESTS

[75] Inventors: Alfred R. Boll, St. Croix; David G. Finke; Charles S. Koehn, both of St. Paul, all of Minn.

[73] Assignee: West Publishing Company, Eagan, Minn.

[21] Appl. No.: 509,124

[22] Filed: Jul. 31, 1995

[51] Int. Cl.⁶ .................................................. H01J 13/00
[52] U.S. Cl. ................. 395/200.12; 364/284.4; 364/DIG. 1
[58] Field of Search ........................... 395/200.01, 800, 395/200.12; 364/284.4, DIG. 1

[56] References Cited

U.S. PATENT DOCUMENTS

| | | | |
|---|---|---|---|
| 4,543,627 | 9/1985 | Schwab | 364/200 |
| 4,769,772 | 9/1988 | Dwyer | 364/300 |
| 4,876,643 | 10/1989 | McNeill et al. | 364/200 |
| 5,046,002 | 9/1991 | Takashi et al. | 364/200 |
| 5,063,500 | 11/1991 | Shorter | 395/200 |
| 5,126,932 | 6/1992 | Wolfson et al. | 364/131 |
| 5,133,075 | 7/1992 | Risch | 395/800 |
| 5,230,048 | 7/1993 | Moy | 395/600 |
| 5,249,290 | 9/1993 | Heizer | 395/650 |
| 5,280,580 | 1/1994 | Brooks et al. | 395/200 |
| 5,287,461 | 2/1994 | Moore | 395/275 |
| 5,327,549 | 7/1994 | Nissimov et al. | 395/425 |
| 5,341,477 | 8/1994 | Pitkin et al. | 395/200.09 |
| 5,345,586 | 9/1994 | Hamala et al. | 395/650 |
| 5,355,488 | 10/1994 | Cox et al. | 595/650 |
| 5,379,424 | 1/1995 | Morimoto et al. | 395/600 |
| 5,500,929 | 3/1996 | Dickinson | 395/160 |
| 5,548,724 | 8/1996 | Akizawa et al. | 395/200.03 |

OTHER PUBLICATIONS

Ward Rosenberg, David Kinney and Gerry Fisher, *Understanding DCE*, 1992, pp. 70–79, DCE Directory Service: Locating Resources.

Consultative Committee on International Telegraphy and Telephony (CCITT), "The Directory–Overview of Concepts, Models and Services", (Melbourne, 1988) pp. 4–19.

Primary Examiner—Alyssa H. Bowler
Assistant Examiner—John Harrity
Attorney, Agent, or Firm—Kinney & Lange, P.A.

[57] ABSTRACT

The present invention provides a method of processing transaction requests from client applications within a computer network having a plurality of client servers. Each client server has a work share and a set of attributes that including a name, an address and a list of services for fulfilling transaction requests. Each transaction request identifies attributes necessary for fulfilling the request. The method entails identifying a set of client servers having the necessary attributes and defining a work distribution function. The work distribution function, which distributes transaction requests, randomly selects a client server from the set of client servers, according to work shares of the client servers.

17 Claims, 4 Drawing Sheets

TABLE OF ATTRIBUTES

| NAME | ADDRESS | DATABASES | WORK SHARE | SOFTWARE |
|---|---|---|---|---|
| NUM28 | ADDR-28 | DB1, DB4, DB6 | 10 | REL1 |
| NUM30 | ADDR-30 | DB1, DB2, DB3 | 10 | REL2 |
| NUM32 | ADDR-32 | DB1, DB4, DB5 | 20 | REL2 |
| NUM34 | ADDR-34 | DB1, DB6, DB7 | 50 | REL2 |
| NUM36 | ADDR-36 | DB1, DB8, DB9 | 10 | REL0 |

*Fig. 3*

TABLE OF ATTRIBUTES

| ATTRIBUTE | CLIENT SERVERS |
|---|---|
| DB1 | NUM 28, NUM 30, NUM 32, NUM 34, NUM 36 |
| DB2 | NUM 30 |
| DB3 | NUM 30 |
| DB4 | NUM 32 |
| DB5 | NUM 32 |
| DB6 | NUM 34 |
| DB7 | NUM 34 |
| DB8 | NUM 36 |
| DB9 | NUM 36 |
| REL0 | NUM 36 |
| REL1 | NUM 28 |
| REL2 | NUM 30, NUM 32, NUM 34 |

INTERPROCESS COMMUNICATIONS INTERFACE FOR MANAGING TRANSACTION REQUESTS

BACKGROUND OF THE INVENTION

The present invention pertains to a method and apparatus for managing transaction requests in a computer service network. In particular, the invention efficiently distributes transaction requests from network clients across a pool of available client servers, using ranked server attributes and a random workload distribution function.

Data-on-demand computer service networks, primarily for distributing information to subscribing clients, have traditionally used a spoke-and-hub database architecture. This architecture places a large central database at the hub of a computer network which enables numerous clients to share the database. A client accesses the network via a remote access station, usually a personal computer fitted with a modem and special application software. Invoking the application software initiates a client application, i.e. a specific use of the personal computer as an interface for communicating with the central database. The client application then requests a session with the central database. A session refers to all the activities between the client application and the central database. During the session, the client makes one or more transaction requests for specific data using algebraic, boolean, or probabilistic queries that define attributes of the desired data. The service network includes a central processing facility, typically a large, high-capacity computer, for receiving and managing communications between the many client applications and the database. The central processing facility processes these queries, searches the database, and transmits the desired data to client applications at the remote access stations.

Recently, such service networks have begun using a distributed database architecture that provides several component databases with dedicated client servers, instead of one central database and a central processing facility. Each client server, or search engine, includes facilities for processing data queries, searching its database, and transmitting data to requesting client applications. The distributed architecture allows greater data capacity, duplicate or redundant data storage, and decreased response time to client requests. In particular, the distributed database is often organized such that high-demand data resides within two or more component databases and low-demand data resides within other component databases. Additionally, the distributed architecture not only tolerates differences among client servers but also exploits these differences to achieve an optimal use of computer resources. For instance, component databases containing low-demand data may be linked to less-costly, rudimentary client servers, whereas high-demand databases may have state-of-the-art client servers. Thus, in short, the distributed architecture provides much greater flexibility in managing the computer service network.

Although operating under the distributed architecture provides high levels of flexibility, it also requires more elaborate and complex techniques for managing and coordinating communications between client applications and client servers. In contrast to the hub-and-spoke architecture requiring communications between one central processing facility and a number of client applications, the distributed architecture requires communications between many client servers and each client application. Moreover, the advent of increased levels of data redundancy raises new concerns for intelligently distributing requests, i.e., load balancing, among client servers having identical component databases or other duplicate functionality. Accordingly, there is a need for a method and a system of answering client requests that efficiently assigns requests using not only data-request or client server criteria but also network load-balancing factors.

SUMMARY OF THE INVENTION

The present invention provides a method of processing transaction requests from client applications within a computer network having a plurality of client servers. Each client server has a set of attributes that includes identification data and capabilities available for fulfilling transaction requests. The transaction request identifies attributes necessary to fulfill the request. The method includes identifying a set of client servers having the attributes necessary to fulfill the transaction request and defining a work distribution function. The work distribution function, which distributes transaction requests, selects a client server from the set of client servers.

In one form of the method, the transaction request identifies attributes ranked according to desirability for fulfilling the transaction request, enabling the sorting of the set of client servers, according to the desirability of their attributes. The invention identifies a subset of client servers most desirable for fulfilling the transaction request.

In another form of the method, each client server of the set of client servers has a work share used in assigning a subrange of the work distribution function to each client server of the set of client servers. Preferably, assigning each client server a subrange of the work distribution function entails providing a work distribution scale that defines a domain of the work distribution function and determining a subrange of the work distribution scale, according to the ratio of the work share of the respective client server to a sum of work shares of client servers of the set of client servers.

In one other form of the method, the work distribution scale identifies a set of work distribution indices used for selecting a client server from the set of client servers. Selecting a client server entails randomly selecting a work distribution index from the work distribution scale and selecting the client server corresponding to a subrange containing the work distribution index.

The invention also provides a communications interface for a computer network having a client application and a plurality of client servers. Each client server has a work share and a set of attributes including identification data and capabilities available for fulfilling transaction requests. The communications interface receives a transaction request from the client application. The transaction request identifies attributes necessary for fulfilling the request and attributes ranked according to desirability for fulfilling the request. The interface identifies a set of client servers having the necessary attributes and defines a work distribution function based on work shares of client servers of the set of client servers. The interface then selects a client server from the set of client servers, according to the work distribution function.

In one form, the communication interface selects a client server by identifying a most-desirable subset of client servers from the set of client servers and randomly selecting a client server from the most-desirable subset of client servers having the necessary attributes, using the work distribution function. Preferably, the communications interface identifies the set of most-desirable client servers by sorting the set of client servers, according to the ranked attributes. The interface includes an interface database containing the attributes of each client server and means for searching the database to identify client servers having necessary attributes.

In another form, the communications interface includes a capability for adding a new client server to the plurality of client servers by writing a work share and a set of attributes of the new client server to the interface database.

BRIEF DESCRIPTION OF THE DRAWINGS

FIG. 3 illustrates a typical table of client servers for the communications interface of the present invention.

FIG. 4 shows a typical table of attributes for the communications interface of the present invention.

DETAILED DESCRIPTION OF THE PREFERRED EMBODIMENTS

Figure 1:
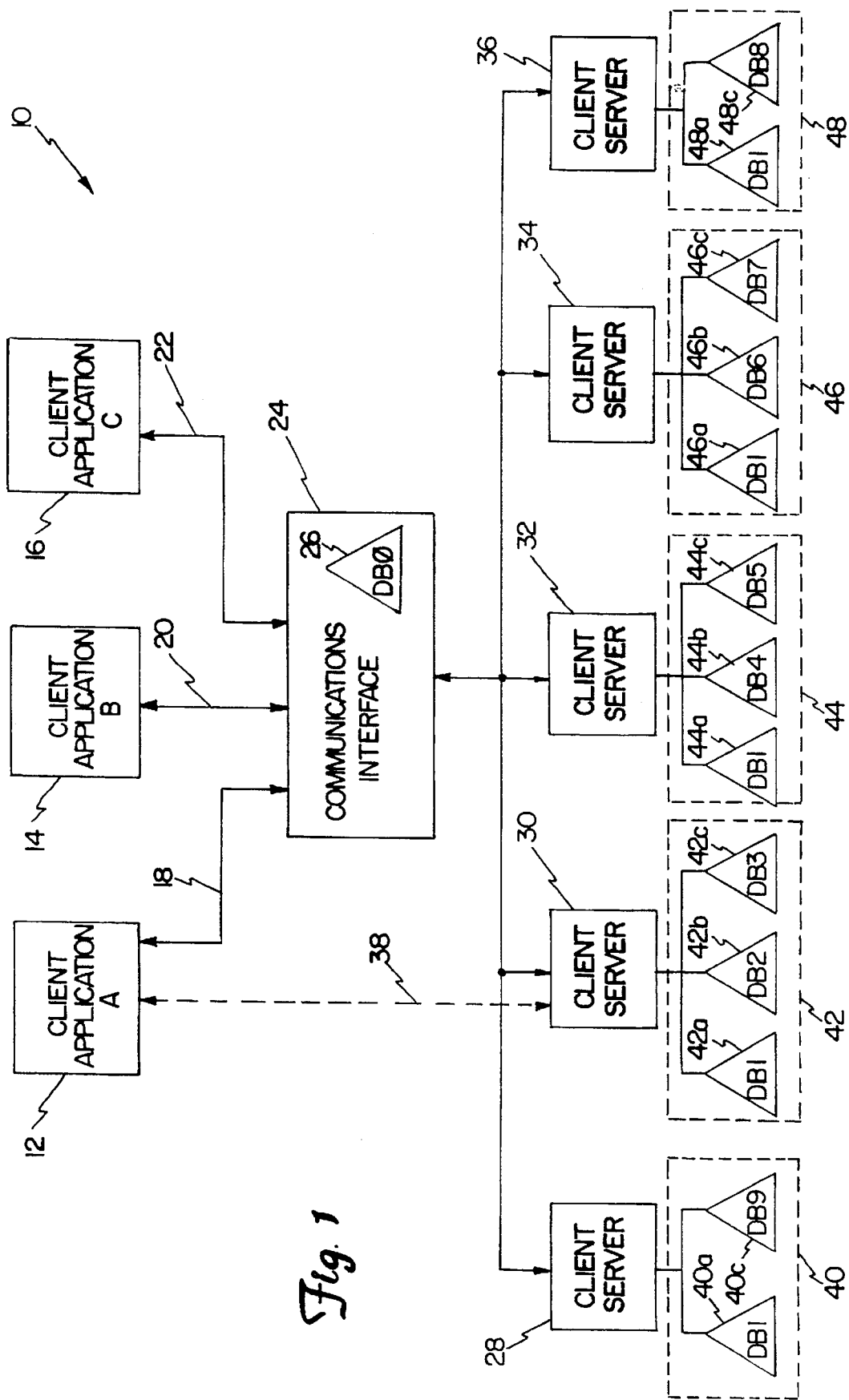
FIG. 1 is a block diagram of a computer network organized around a communications interface in accordance with the present invention.

FIG. 1 is a simplified illustration of computer service network 10 having client applications 12, 14, and 16 capable of transmitting transaction requests via respective two-way communications paths 18, 20, and 22 to communications interface 24. Communications interface, which includes interface database 26 and is connected to client servers 28, 30, 32, 34, and 36, answers transactions requests by providing data identifying a client server to a requesting client applications. Client servers 28, 30, 32, 34, and 36 are linked to databases 40, 42, 44, 46, and 48, respectively. Databases 40, 42, 44, 46, and 48 include database components 40a–40c, 42a–42c, 44a–44c, 46a–46c, and 48a–48c which preferably include redundant data as necessary to facilitate optimal servicing of requests from client applications 12, 14, and 16. More precisely, database components 40a, 42a, 44a, 46a, and 48a are shown as having identical data DB1, which is frequently demanded by client applications 12, 14, and 16, whereas other less-frequently used data DB2–DB9 appears in only one database. Although shown for sake of clarity as only having access to the associated databases, client servers 28–36 also include the ability to act as client application to other computer service networks. Interface 24 responds to a transaction request from client application 12 to provide direct data communication path 38 between application 12 and client server 30. Alternatively, interface 24 could serve as an intermediate link connecting client application 12 to client server 30. Once connected to a client server, the client application may conduct more than one transaction with the client server.

Figure 2:
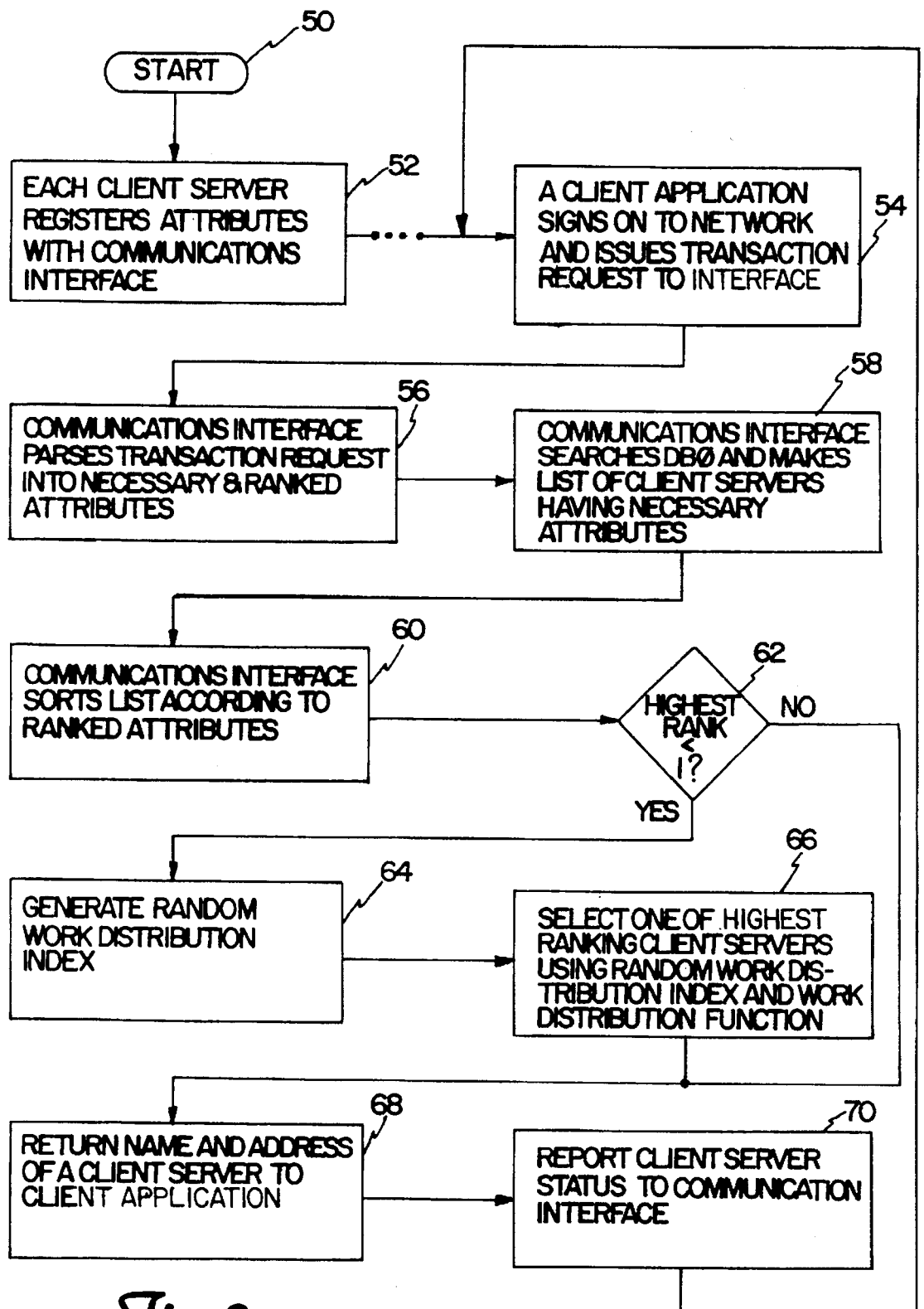
FIG. 2 is a flow diagram illustrating operation of the communications interface in accordance with the method of the present invention.

Detailed operation of the network and in particular operation of communications interface 24 are best described in relation to the high-level flow diagram of FIG. 2. The process starts at 50 when conditions are favorable for operating the network. At step 52, client servers 28, 30, 32, 34, and 36 individually initiate communications with interface 24 and register respective sets of attributes with interface 24. Interface 24 writes these sets of attributes to database 26. Each set of attributes identifies the distinguishing descriptive and functional traits of a respective client server. A set of attributes for each client server preferably includes: identifying data, capabilities or services, and a current software description. Examples of identifying data include the name and address of the client server, and examples of capabilities include associated databases and other specific computer resources, such as other service networks the client server can access. In addition to the attributes, each client server also registers a desired work share, or assignment, indicating a desired proportion of network workload, preferably measured as a percentage share of transaction requests during a unit operating period. Desired work shares preferably reflect practical limitations of the client servers and desirable work distribution patterns. In particular, a desired work share reflects a total desired workload for a particular client server rather than a workload for a specific database component or other service of the client server. These attributes and desired work shares are logically organized as one or more searchable tables within database 26. Examples of such tables for client servers 28–36 are shown in FIGS. 3 and 4. FIG. 3 shows a table organized according to client servers, and FIG. 4 shows a table organized according to server attributes.

At step 54, interface 24 receives a transaction request from client application 12, 14, or 16 via communications paths 18, 20, or 22, seeking to establish a transaction with a client server. The transaction request usually pertains to a data-specific operation, such as a data query, that may be answered by only one client server or by several client servers, depending on the nature of the transaction request. To facilitate optimal use of client servers in answering the request, the transaction request identifies a list of server attributes necessary to complete the transaction request. The request also includes attributes ranked according to desirability for answering, or fulfilling, the request. The transaction request identifies attributes according to preferred, not-preferred, and least-preferred categories, or ranks. The not-preferred category identifies attributes that are necessary for answering the request. The preferred, or favorite, category identifies attributes that are useful, but typically not essential, for completing the request, and the least-preferred category identifies attributes that may be a hinderance to completing the request. The request arrives in a form including one to three character strings: a preferred string, a not-preferred string, and/or a least-preferred string. Within each string, individual attributes are delimited by special characters treated as boolean operators, such as "&" for AND-ing, "/" for OR-ing, "!" for NOT-ing and "( )" for algebraic nesting. The provision for logical operators enables the definition of combination attributes as well as negative attributes. Thus, the request identifies up to three categories of attributes, each category including individual, combination, and/or negative attributes. For purposes of further illustration, the description that follows traces a sample transaction request from client application 12 through the flow chart. The sample request designates data DB1 as a not-preferred (i.e., necessary) attribute, software release 2 (REL 2) as a preferred attribute, and software release 0 (REL 0) as a least-preferred attribute.

At step 58, interface 24 searches database 26 for all client servers having the necessary attributes and forms a list of client servers capable of completing the transaction request. For the sample request designating data DB1 as a not-preferred attribute, the resulting list identifies client servers 28, 30, 32, 34, and 36, because each of these has access to data DB1.

Before sorting the list of client servers, the interface purges the list of client servers, based on the operational state of each client server. Each client server periodically reports its operational state to the interface which updates interface database 26 to reflect the last reported state of each client server. Client servers may have any one of several operational states, such as in-service, out-of-service, maximum-service, drain-service, etc. Maximum-service indicates that a client server operating at full capacity cannot accept further requests until its actual workload decreases to a preset threshold. Drain-service indicates that a client server is changing from in-service to out-of-service and can only accept transaction requests from client applications it is already serving. The interface purges the list of client servers that are out-of-service, maximum-service, or draining, thereby removing them from further consideration for a particular request. At step 60, the interface sorts the list of client servers, according to the ranked attributes.

Sorting the list according to the preferred sorting procedure yields three ranked categories, or groups, of client servers: (1) a preferred category, (2) a not-preferred category, and (3) a least-preferred category. At the start of the procedure, all the listed client servers are in the not-preferred category; therefore, sorting entails demoting or promoting client servers from the not-preferred category to the least-preferred or preferred category. More particularly, the procedure first demotes all client servers having any least-preferred attribute from the not-preferred category to the least-preferred category and then promotes any remaining client servers having a preferred attribute to the preferred category. The sample list of client servers indicates that client server 36 has least-preferred attribute REL0 and that client servers 30, 32, and 34 have preferred attribute REL2. Thus, sorting the sample list of client servers according to the preferred procedure yields a least-preferred category identifying client server 36, a not-preferred category identifying client server 28, and a preferred category identifying client servers 30, 32 and 34.

Having sorted the list, the interface identifies a set of highest-ranking, or most-desirable, client servers by polling the categories in descending order for the presence of at least one client server. Thus, according to the preferred procedure, the interface successively polls the preferred category, the not-preferred category, and lastly, the least-preferred category, until it finds a category containing at least one client server, i.e. the highest-ranking set of client servers. Applying this procedure to the sorted sample list identifies the preferred category as the set of highest-ranking client servers. This set identifies client servers 30, 32, and 34.

At step 62, the interface decides whether the set of highest-ranking client servers includes more than one client server. If there is only one client server, the interface returns the name and address of this client server to the client application via communications path 18, 20, or 22 corresponding to the requesting client server. However, if there is more than one highest-ranking client server, as in the sample sorted list, the interface, preferably equipped with a random number generator, generates a random work distribution index, as indicated at step 64. As used herein, random includes pseudo-random which encompasses a simulation of random numbers, such as by a generator that exhausts its finite range of numbers before repeating the pseudo-random number generation.

The interface uses the random work distribution index in conjunction with a work distribution function to select one of the highest-ranking client servers. The work distribution index is an index randomly chosen from a finite set of indices representing the functional domain, or set of inputs, of the work distribution function. This set of indices defines a work distribution scale, or load-balancing range. The probability of choosing any index of the work distribution scale is governed by a probability density function, such as the presently-preferred uniform probability density function. The uniform density function assigns a uniform, or constant, probability to each index of the work distribution scale, making each index equally likely to be selected. Preferably, the index is a random number chosen from a range of numbers defining the work distribution scale. For example, each number of a work distribution scale defined by the set of integers 1–100 having a uniform probability density has a 1 percent chance of selection.

The work distribution function assigns, or maps, each work distribution index to a client server of the set of highest-ranking client servers. This mapping entails assigning specific subsets, or subranges, of the work distribution scale to each client server of the set of highest-ranking client servers. Therefore, randomly selecting an index is equivalent to randomly selecting a client server.

Preferably, the subranges are exclusive to each client server so that any given index maps to only one client server. It is also preferred that the union, or concatenation, of all the subranges for the client servers in the set spans the entire work distribution scale to preclude the possibility of drawing a work distribution index that does not indicate a client server. Additionally, the number of indices in each subset or subrange, i.e. the size of each subrange, is commensurate to each client server's desired work share. More particularly, the size of each subrange reflects a corresponding client server's proportionate share of the total work share assigned to the set of highest-ranking client servers. The total work assigned to the set is the sum of the desired work shares of all servers in the set, meaning that the proportionate work share for a client server is the ratio of its desired work share to the sum of desired work shares. Once the work share for each client server of the set is known, the work shares are translated into proportionate subranges of the work distribution scale to complete definition of the work distribution function. Thus, the probability of selecting each client server is based on a ratio of its work share to a sum of work shares of client servers.

Figure 5:
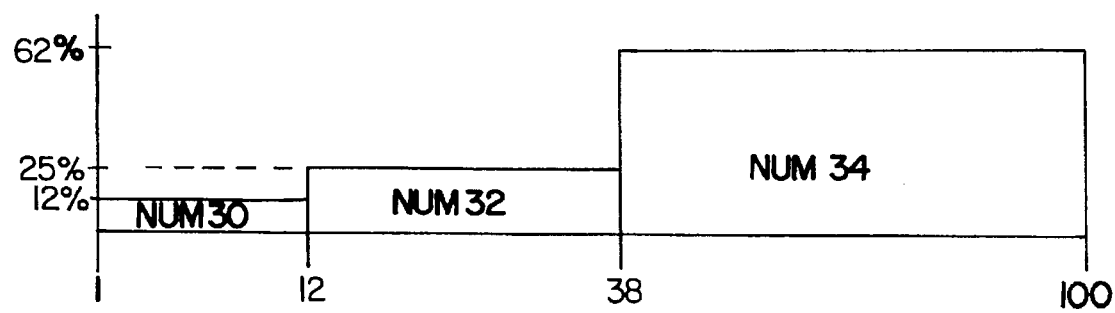
FIG. 5 is an illustration of a work distribution function in accordance with the present invention.

In the sample request, the set of client servers includes client servers 30, 32, and 34 with respective desired work shares 10, 20, and 50 (as shown in FIG. 3) indicating the desired percentage of all transaction requests for each server. Because the sum of these assignments is 80, the resulting ratios are 10:80 (12.5%), 20:80 (25%), and 50:80 (62.5%). Thus, for the work distribution scale ranging from 1 to 100, the subrange 1–12 corresponds to client server 30; the subrange 13–38 represents client server 32; and the subrange 39–100 represents client server 34. Using a larger distribution scale (i.e., one with more indices, such as one extending from 1–1000) provides greater precision in assigning ranges exactly matching the ratios, whereas using a smaller distribution scale usually reduces precision. Thus, adjusting the size of the work distribution scale regulates tolerance of the workload distribution function. FIG. 5 shows a sample work distribution function for the highest-ranking client servers 30, 32, and 34. Thus, a random work distribution index of 9 indicates that client server 30, identified on the network as NUM30, will receive the transaction request, whereas a distribution index of 40 would assign the transaction request to client server 34.

After selecting the client server, interface 24 answers the requesting client application by returning data identifying the selected client server, namely the identification or connection data, to the requesting client application, as shown at step 68. This data includes the name and address of the client server. For example, interface 24 returns the name NUM30 and address ADDR-30 to client application 12.

Client application 12 receives the identifying data and initiates a direct transaction with client server 30, using the name and address provided by the interface, as indicated by communication path 38 in FIG. 1.

Artisans will appreciate that the interfacing procedure of the present invention provides a flexible and efficient way of managing transaction requests from client applications to a number of client servers. Moreover, artisans will also appreciate that the interface is easily and inherently expandable to include increasing numbers of client servers without modifying the network architecture or the governing logic of the interface, as new client servers need only register, or log, their attributes with the interface to begin serving client applications.

Furthermore, artisans will appreciate that the present method of operating a communications interface has particular value in operating a distributed database system, such as that illustrated by the arrangement of client servers and associated databases of FIG. 1. Specifically, the method of operating the communications interface is also a method of processing data queries in a distributed database system having a plurality of client servers mapped to a plurality of databases. In all respects, operation of the interface to process data queries is identical to operations for processing a generic transaction request. Each client server has attributes preferably including a name, an address, a desired work share, a list of associated databases, and the data query identifies necessary attributes and ranked attributes. In both cases, essential aspects of the method include identifying a set of highest-ranking client servers capable of answering the transaction request or data query and randomly selecting a client server from the set of highest-ranking client servers, according to desired work shares and a work distribution function.

Although the present invention has been described with reference to preferred embodiments, workers skilled in the art will recognize that changes may be made in form and detail without departing from the spirit and scope of the invention.

What is claimed is:

1. A method of processing a transaction request from a client application within a computer network having a plurality of client servers, each client server having a set of attributes including identification data and capabilities available for fulfilling transaction requests, the transaction request identifying attributes necessary to fulfill the request and attributes ranked according to desirability for fulfilling the request, the method comprising:

identifying a set of client servers having the attributes necessary to fulfill the transaction request;

providing a work distribution function for distributing transaction requests among the client servers of the set of client servers; and selecting a client server from the set of client servers according to the work distribution function;

sorting the client servers, according to the attributes ranked according to desirability for fulfilling the transaction request; and identifying a subset of client servers most desirable for fulfilling the transaction request.

2. The method of claim 1 wherein providing the work distribution function includes:

providing a work share for each client server of the set of client servers; and assigning a subrange of the work distribution function to each client server of the set of client servers, based on the work shares of the client servers of the set of client servers.

3. The method of claim 2 wherein assigning each client server a subrange of the work distribution function includes:

providing a work distribution scale defining a domain of the work distribution function for the set of client servers; and determining each subrange according to a ratio of the work share of the respective client server to a sum of work shares of client servers of the set of client servers.

4. The method of claim 3 wherein the work distribution scale identifies a set of work distribution indices, and selecting a client server from the set of client servers includes:

randomly selecting a work distribution index from the work distribution scale; and selecting a client server corresponding to a subrange containing the work distribution index.

5. The method of claim 4 wherein randomly selecting a work distribution index is governed by a predetermined probability density function.

6. The method of claim 1 wherein the attributes ranked according to desirability include first and second categories of attributes and wherein the first category of attributes has priority over the second category of attributes such that a client server having any attribute of the second category is sorted to a lower level than another client server having no attribute of the second category.

7. The method of claim 1 wherein sorting according to the attributes ranked for desirability includes sorting client servers such that no client server is sorted to a level higher than its lowest-ranked attribute.

8. The method of claim 1 wherein the transaction request additionally identifies attributes undesirable for fulfilling the transaction request and wherein identifying the set of client servers further includes sorting the client servers so that client servers having an attribute undesirable for fulfilling the request are sorted to a lower level than client servers having no undesirable attribute.

9. The method of claim 1 wherein selecting the client server further includes connecting the client application to the selected client server.

10. The method of claim 1 wherein the transaction request is a data query.

11. A communications interface for a computer network having a client application and a plurality of client servers, each client server having a work share and a set of attributes including identification data and capabilities available for fulfilling transaction requests, the communications interface comprising:

means for receiving a transaction request from the client application, the transaction request identifying attributes necessary for fulfilling the request and attributes ranked according to desirability for fulfilling the request;

means for identifying a set of client servers having attributes necessary for fulfilling the transaction request;

means for defining a work distribution function based on work shares of client servers of the set of client servers; and means for selecting a client server from the set of client servers, according to the work distribution function.

12. The communications interface of claim 11 wherein the means for selecting a client server includes:

means for identifying a most-desirable subset of client servers from the set of client servers; and means for randomly selecting a client server from the most-desirable subset of client servers, using the work distribution function.

13. The communications interface of claim 12 wherein means for identifying a set of most-desirable client servers includes means for sorting the list of client servers, according to the ranked attributes.

14. The communications interface of claim 11 wherein means for identifying a set of client servers having attributes necessary for fulfilling the request includes:

an interface database containing the set of attributes of each client server; and means for searching the interface database.

15. The communications interface of claim 11 further including means for adding a new client server to the plurality of client servers.

16. The communications interface of claim 15 wherein the means for adding a new client server includes means for writing a work share and a set of attributes of the new client server to an interface database.

17. The communications interface of claim 11 wherein the work distribution function is based on ratios of the work share of each client server of the set of client servers to a sum of work shares of client servers of the set of client servers.

* * * * *

UNITED STATES PATENT AND TRADEMARK OFFICE
CERTIFICATE OF CORRECTION

PATENT NO. : 5,644,720

DATED : JULY 1, 1997

INVENTOR(S) : ALFRED R. BOLL, DAVID G. FINKE, CHARLES S. KOEHN

It is certified that error appears in the above-indentified patent and that said Letters Patent is hereby corrected as shown below:

On the title page under [75] Inventors: after Alfred R. Boll, delete "St. Croix", insert --Marine on St. Croix--

Signed and Sealed this

Eighteenth Day of November 1997

Attest:

BRUCE LEHMAN

Attesting Officer

Commissioner of Patents and Trademarks